United States Patent [19]

Halm et al.

[11] Patent Number: 6,126,803
[45] Date of Patent: Oct. 3, 2000

[54] METHOD FOR REMOVING PARTICULATE FROM A LIQUID SILICON CONTAINING COMPOUND

[75] Inventors: Roland Lee Halm, Midland; Keith Quentin Hayes, II, Bay City, both of Mich.

[73] Assignee: Dow Corning Corporation, Midland, Mich.

[21] Appl. No.: 09/174,338

[22] Filed: Oct. 19, 1998

[51] Int. Cl.[7] .................................................. B01D 17/06

[52] U.S. Cl. ........................ 204/572; 204/571; 209/127.1; 210/748

[58] Field of Search ..................................... 204/572, 571; 210/748; 209/127.1

[56] References Cited

U.S. PATENT DOCUMENTS

| | | | |
|---|---|---|---|
| 3,891,528 | 6/1975 | Griswold | 204/186 |
| 3,928,158 | 12/1975 | Fritsche et al. | 204/188 |
| 4,786,387 | 11/1988 | Whitlock | 204/183.1 |
| 5,308,586 | 5/1994 | Fritsche et al. | 422/147 |
| 5,861,089 | 1/1999 | Gatti et al. | 204/563 |

*Primary Examiner*—Margaret G. Moore
*Attorney, Agent, or Firm*—Melvin D. Fletcher

[57] ABSTRACT

A method for removing a particulate from a liquid silicon containing compound. The method comprises contacting a suspension comprising a non-conducting liquid silicon containing compound and a particulate having a different dielectric constant than the non-conducting liquid silicon containing compound with a non-conducting packing substrate in an electric field. The present method is especially useful for removing suspended particulate ranging in size from about 0.01 to 100 microns from silicon fluids.

17 Claims, 1 Drawing Sheet

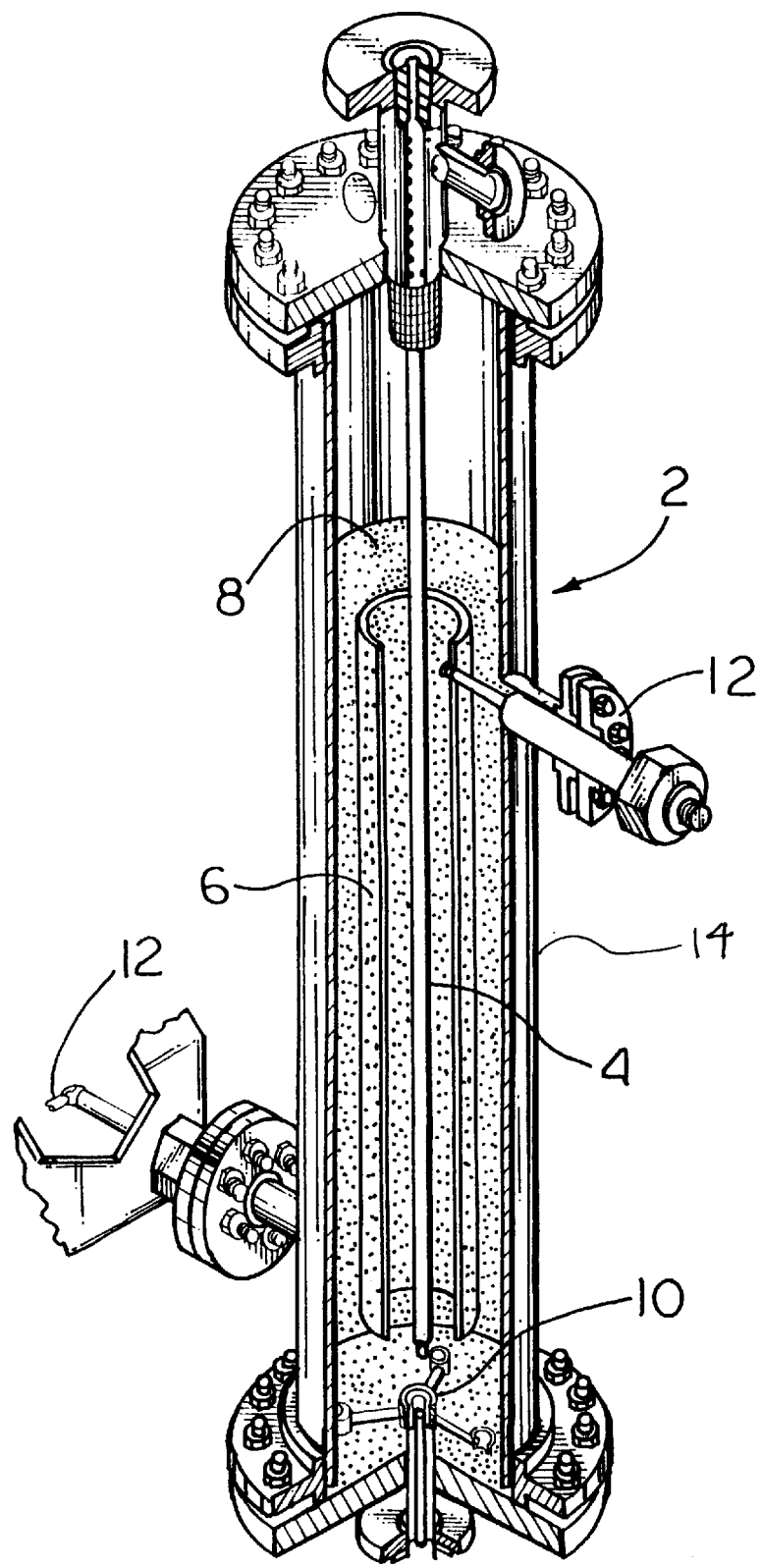

METHOD FOR REMOVING PARTICULATE FROM A LIQUID SILICON CONTAINING COMPOUND

BACKGROUND OF INVENTION

The present invention is a method for removing a particulate from a liquid silicon containing compound. The method comprises contacting a suspension comprising a non-conducting liquid silicon containing compound and a particulate having a different dielectric constant than the non-conducting liquid silicon containing compound with a non-conducting packing substrate in an electric field.

The use of electric fields to enhance oil field emulsions separation is a well known and accepted practice in the petroleum industry. Electric fields greatly increase the sub-micron size particle removal efficiency from process or waste streams over conventional filters and settlers using mechanical aids to effect separation. Fritsche et al., U.S. Pat. No. 3,928,158, describe an electrostatic filter for removal of suspended electrically conductive contaminants from hydrocarbon oils. The contaminants are removed as the hydrocarbon oil flows through an electrostatic field maintained across a bed of beads and the contaminants adhere to the beads.

Fritsche et al., U.S. Pat. No. 5,308,586, describe an improved glass bead comprising silicon and potassium oxides for use in packed beds in electrostatic separators for suspended particle separation from hydrocarbon oils.

The present invention provides a method for removing particles from a liquid silicon containing compound. The invention further provides a method for backflushing an electric field enhanced separator in a fraction of the time required to clean or replace conventional filters.

SUMMARY OF INVENTION

The invention is a method for removing a particulate from a liquid silicon containing compound. The method comprises contacting a suspension comprising a non-conducting liquid silicon containing compound and a particulate having a different dielectric constant than the non-conducting liquid silicon containing compound with a non-conducting packing substrate in an electric field. The present method is especially useful for removing suspended particulate from silicone fluids.

BRIEF DESCRIPTION OF THE DRAWINGS

FIG. 1 is a cross-sectional view of an electric field enhanced separator for removing particulate from a non-conducting liquid silicon containing compound.

DESCRIPTION OF INVENTION

The present invention is a method for removing a particulate from a liquid silicon containing compound. The method comprises contacting a suspension comprising a non-conducting liquid silicon containing compound and a particulate having a different dielectric constant than the non-conducting liquid silicon containing compound with a non-conducting packing substrate in an electric field.

Contacting the suspension comprising a non-conducting liquid silicon containing compound and a particulate having a different dielectric constant than the non-conducting liquid silicon containing compound can be conducted in commercially available electric field enhanced separators similar to those described in, for example, U.S. Pat. Nos. 3,928,158 and 5,308,586, which are incorporated herein by reference for teaching such separators. FIG. 1 shows a cross-sectional diagram of a separator 2 useful in the practice of the present method. Separator 2 contains three electrodes, a center ground electrode 4, a tubular shell electrode 6 and a outer wall ground electrode 14. Separator 2 is shown filled with non-conducting packing substrate 8. A screen (not shown) is placed in the bottom of the separator just above backflush distributor 10 to prevent the non-conducting packing substrate 8 from entering distributor 10 and leaving with the non-conducting liquid silicon compound. A DC voltage, typically about 2 to 50 Kv per inch, is applied by the lower one of a pair of high voltage bushings 12 which support the tubular shell electrode 6 within the separator to apply an electrical field through non-conducting packing substrate 8.

In the present method the non-conducting liquid silicon containing compound must have a dielectric constant different than that of the particulate. By "silicon containing compound" it is meant those chemical entities comprising at least one silicon atom and which are liquid under the condition of the method. By "non-conducting" it is meant a liquid of relatively high electrical resistivity which is about $1 \times 10^8$ ohm·cm at 125°.

The non-conducting liquid silicon containing compounds useful in the present method may be a silane or siloxane. Examples of non-conducting silicon containing compounds include silanes described by formula $$R^1{}_a H_b SiX_{4-a-b},  \qquad (1)$$

where each $R^1$ is an independently selected monovalent hydrocarbon radical comprising 1 to about 12 carbon atoms, X is a halogen atom, a=0 to 4, b=0 to 4, and a+b=0 to 4. Each $R^1$ can be selected, for example, from a group consisting of substituted and unsubstituted alkyls, cycloalkyls, alkenyls, aralkyls, and aryls. $R^1$ can be, for example, methyl, ethyl, chloromethyl, 3,3,3-trifluoropropyl, cyclopentyl, cyclohexyl, vinyl, allyl, 5-hexenyl, benzyl, beta-phenylethyl, phenyl, tolyl, xylyl, napthyl, and chlorophenyl. Preferred is when $R^1$ is methyl. In Formula 1, each X can be an independently selected halogen atom. Preferred is when X is chlorine.

The non-conducting liquid silicon containing compound can be a silicon containing polymer. By "silicon containing polymer" it is meant those polymers and copolymers in which the silicon atom is a substituent of the repeating units forming the polymer backbone chain. Examples of such silicon containing polymers include linear, branched, and cyclic siloxanes; silicone resin precursors; polysilanes; and mixtures of two or more of the described silicon containing polymers. Polysilane polymers useful in the method are described by formula $$R^4{}_3Si(SiR^4{}_2)_n SiR^4{}_3, \qquad (2)$$

where each $R^4$ can be independently selected from the group consisting of hydrogen, halogen, and monovalent hydrocarbon radicals comprising 1 to about 12 carbon atoms, and n is a value within a range of 0 to about 500. $R^4$ can be, for example, an alkyl such as methyl, ethyl, propyl, and tert-butyl; an aryl such as phenyl; an alkenyl such as vinyl, allyl, and hexenyl; a cycloalkyl such as cyclopentyl and cyclohexyl; a substituted alkyl such as 3,3,3-trifluoropropyl; and a substituted aryl such as chlorophenyl.

The non-conducting liquid silicon containing compound can be a silicon containing polymer, such as, linear siloxane polymers described by formula $$R^2 R^3{}_2 (SiR^3{}_2 O)_z SiR^3{}_2 R^2, \qquad (3)$$

where each $R^2$ is independently selected from the group consisting of halogen, hydroxy, and $R^3$; each $R^3$ is independently selected from the group consisting of hydrogen and monovalent hydrocarbon radicals comprising 1 to about 12 carbon atoms, and z is a value within a range of 0 to about 1,000. In formula (3), it is preferred that each $R^2$ be independently selected from the group consisting of, chlorine, hydroxy, and methyl. $R^3$ can be, in addition to hydrogen, a substituted or unsubstituted alkyl, cycloalkyl, alkenyl, and aryl as described for $R^1$. In formula (3) it is preferred that z be a value within a range of about 0 to 700. More preferred is when the value z is within a range of about 1 to 200. Specific examples of linear siloxane polymers can be, for example, a methylvinyldimethylsiloxane copolymer with vinyldimethylsiloxy endblocking, dimethylsiloxane polymer with vinyldimethylsiloxy endblocking, methylphenyldimethylsiloxane copolymer with trimethylsiloxy endblocking, and dimethylhexenylmethylsiloxane polymer with hexenyldimethylsiloxy endblocking.

The non-conducting liquid silicon containing compound can be a cyclic siloxane polymers described by formula

$$(R^3{}_2SiO)_m, \qquad (4)$$

where $R^3$ is as previously described and m is a value within a range of about 3 to 20. Preferred is where m is a value within a range of about 3 to 7. Examples of cyclic polyorganosiloxanes useful in the present method are hexamethylcyclotrisiloxane, octamethylcyclotetrasiloxane, hexaethylcyclotrisiloxane, and octaethylcyclotetrasiloxane.

The non-conducting liquid silicon containing compound can be a branched polymer suitable as a precursor for forming a silicone resin formed of units described by formulas $R^3{}_3SiO_{1/2}$, $R^3{}_2SiO_{2/2}$, $R^3SiO_{3/2}$, and $SiO_{4/2}$, where $R^3$ is a previously described.

The non-conducting liquid silicon containing compound useful in the present method can typically have a viscosity in the range of about 0.0001 to 100 Pa·s at 25° C. Preferably the viscosity is in the range of about 0.0005 to 2 Pa·s at 25° C. It may be desirable that the non-conducting liquid silicon containing compound have a viscosity in the range of about 0.005 to 0.5 Pa·s at 25° C.

The present method is useful for removing particulate, such as, catalyst fines, suspended particles, metal oxides, metals and inorganic salts from the non-conducting liquid silicon compound. The inventors have discovered that deformeable particles, such as, magnesium oxide particulate may be removed from the non-conducting silicon compound. Typically, the particulate suspended in the non-conducting liquid silicon compound have a particle size range of about 100 microns or less. The method is especially useful for removing particulate in the range of about 0.01 to 100 microns. Preferably, the particulate is in the range of about 0.05 to 10 microns. The particulate must have a different dielectric constant than the non-conducting liquid silicon containing compound.

The non-conducting packing substrate useful in the method can be, for example, in the form of beads, pellets, granular, or fibrous materials. By "non-conducting" it is meant that the packing substrate has an electrical resistivity sufficient to prevent short-circuiting between the electrodes. Examples of non-conducting packing substrate materials include glass, aluminum oxide, and ceramic. Preferably, the non-conducting packing substrate is aluminum oxide or glass beads forming a packed bed. Suitable glass beads are commercially available and have a diameter of about 1 to 10 mm. Preferably, the glass beads have a diameter of about 2 to 4 mm. The non-conducting packing substrate may have a dielectric constant different from that of the particulate and the non-conducting liquid silicon containing compound.

In the present method an electric field is generated as the electrodes apply an average potential gradient across the non-conducting packing substrate which can be varied from a range of about 1 Kv per inch to 35 Kv per inch. Preferably the electric field is in the range of about 2 Kv per inch to 25 Kv per inch. A commercially available power supply may be adapted to apply the voltage gradient between the electrodes. Preferably the power supply is DC, however an AC power supply may be used.

In conducting the method, the suspension comprising a non-conducting liquid silicon containing compound and particulate having a different dielectric constant than the non-conducting liquid silicon containing compound enter the top of the separator. An electric field is applied across the non-conducting packing substrate as the suspension flows through the non-conducting packing substrate. In the preferred embodiment of the method, the non-conducting packing substrate is a packed bed of glass beads. As the electric field is applied across the packed bed of beads, the suspended particulate accumulate on the bead surface and are removed from the non-conducting liquid silicon containing compound as it exits the bottom of the separator.

As the particulate accumulate on the beads, the beads may be cleaned by backflushing the separator with an adequate volume of non-conducting liquid silicon containing compound, a fluid having a viscosity in the range of about 0.0001 to 0.05 Pa·s at 25° C., solvent or some other compatible fluid to remove the accumulated particulate from the surface of the beads. In order to backflush, the electric field is shut off and the backflush fluid is forced upwardly through the packed bed. When to backflush may be determined by process run time, an increase in amperage to the separator, or by measuring the pressure differential across the non-conducting packing substrate. Preferably, when to clean the separator by backflushing is determined by measuring the pressure drop between the suspension entering the separator and the non-conducting liquid silicon containing compound leaving the separator.

The following examples are provided to illustrate the present invention. These examples are not intended to limit the scope of the claims herein.

EXAMPLE 1

The ability to remove solid potassium carbonate and potassium bicarbonate particulate from a methylvinyldimethylpolysiloxane (MVDMPS) fluid by an electric field separator was evaluated. The MVDMPS fluid evaluated had a viscosity of about 0.3 Pa·s at 25° C. and contained solid potassium carbonate and potassium bicarbonate determined to have a particulate size of about 0.05 to 5 microns measured using a scanning electron microscope. The solid potassium carbonate and potassium bicarbonate concentration was determined using atomic absorption spectroscopy direct dilution (AA) which is an elemental atomic adsorption technique. The MVDMPS fluid was fed into a glass laboratory separator similar to that described in FIG. 1. The separator was 2.5 cm in diameter, 53 cm in length, with a 2.5 cm by 20 cm active zone packed with 3 mm diameter PYREX® beads manufactured by Corning Incorporated, Corning, N.Y., USA. The electric field was generated by a commercially available DC power supply. An MVDMPS sample exiting the separator was collected and analyzed for total potassium by AA. Runs were conducted at different flow rates, temperatures, voltages and solids concentration. The run parameters and analysis results are reported in Table 1.

TABLE 1

Potassium Carbonate and Potassium Bicarbonate Particulate Removed From MVDMPS

| Run No. | Flow Rate ml/min | Temp. ° C. | Voltage Kv/in | Potassium In ppm/wt | Potassium Out ppm/wt |
|---|---|---|---|---|---|
| 1 | 70 | 25 | 20 | 59 | 13 |
| 2 | 50 | 77 | 20 | 59 | 8 |
| 3 | 50 | 98 | 20 | 59 | 9 |
| 4 | 25 | 25 | 10 | 59 | 19 |
| 5 | 25 | 25 | 30 | 59 | 18 |
| 6 | 6 | 25 | 20 | 59 | 4.2 |
| 7 | 6 | 25 | 25 | 59 | 2.7 |
| 8 | 6 | 25 | 30 | 59 | 1 |

EXAMPLE 2

The ability to remove solid potassium carbonate and potassium bicarbonate particulate from a polydimethylsiloxane fluid with dimethylvinyl endblocking (PDMSDMV) by an electric field enhanced separator was evaluated. The PDMSDMV fluid evaluated had a viscosity in the range of about 1.8 to 2.4 Pa·s at 25° C. and contained solid potassium carbonate and potassium bicarbonate determined to have a particulate size of about 0.5 to 5 microns measured using a scanning electron microscope. The procedure was conducted as described in Example 1. The run parameters and analysis results are reported in Table 2.

TABLE 2

Potassium Carbonate and Potassium Bicarbonate Particulate Removed From PDMSDMV

| Run No. | Flow Rate ml/min | Temp. ° C. | Voltage Kv/in | Potassium In ppm/wt | Potassium Out ppm/wt |
|---|---|---|---|---|---|
| 1 | 3 | 25 | 3.5 | 59 | 50 |
| 2 | 3 | 25 | 10 | 61 | 41 |
| 3 | 3 | 25 | 11.3 | 61 | 41 |

TABLE 2-continued

Potassium Carbonate and Potassium Bicarbonate Particulate Removed From PDMSDMV

| Run No. | Flow Rate ml/min | Temp. ° C. | Voltage Kv/in | Potassium In ppm/wt | Potassium Out ppm/wt |
|---|---|---|---|---|---|
| 4 | 3 | 25 | 13 | 61 | 42 |
| 5 | 3 | 25 | 17 | 61 | 45 |
| 6 | 3 | 25 | 0 | 61 | 60 |
| 7 | 6 | 25 | 25 | 59 | 2.7 |
| 8 | 6 | 25 | 30 | 59 | 1 |

EXAMPLE 3

The ability to remove solid potassium carbonate and potassium bicarbonate particulate from a methylvinyldimethylpolysiloxane (MVDMPS) copolymer fluid by an electric field enhanced separator was evaluated. The MVDMPS fluid was evaluated using the procedure of example 1. The MVDMPS fluid was fed into a carbon steel separator similar to that described in FIG. 1. The separator was 5.1 cm in diameter, 43 cm in length, with a 5.1 cm by 30.5 cm active zone packed with 3 mm diameter glass beads manufactured by Corning Incorporated, Coming, N.Y., USA. The electric field was generated by a commercially available DC power supply. An MVDMPS sample exiting the separator was collected and analyzed for total potassium using AA. The concentration of the solids was determined using ultrafiltration and subsequent weighing of the filter paper. Runs were conducted at different flow rates, temperatures, voltages, fluid viscosity and solids concentration. The run parameters and analysis results are reported in Table 3.

TABLE 3

Potassium Carbonate and Potassium Bicarbonate Particulate Removed From MVDMPS

| Run No. | Flow Rate ml/min | Temp. ° C. | Calc. Visc. Pa.s | Voltage Kv/in | Potassium In ppm/wt | Potassium Out ppm/wt | Solids Out ppm/wt |
|---|---|---|---|---|---|---|---|
| 1 | 15 | 120 | 0.09 | 5 | 24 | 0.5 | 5.6 |
| 2 | 15 | 160 | 0.06 | 5 | 24 | 0.5 | 0 |
| 3 | 40 | 180 | 0.05 | 5 | 24 | 0.5 | 0 |
| 4 | 15 | 120 | 0.09 | 15 | 24 | 1.15 | 1.8 |
| 5 | 40 | 180 | 0.05 | 15 | 24 | 0.5 | 0 |
| 6 | 10 | 150 | 0.4 | 5 | 36.5 | 7.5 | 0 |

EXAMPLE 4

The ability to remove solid potassium carbonate and potassium bicarbonate particulate from a polymethylsiloxane fluid with dimethylvinyl endblocking (PDMSDMV) by an electric field enhanced separator was evaluated. The PDMSDMV fluid was evaluated using the procedure of example 1. The PDMSDMV fluid was fed into a carbon steel separator similar to that described in FIG. 1. The separator was 5.1 cm in diameter, 43 cm in length, with a 5.1 cm by 30.5 cm active zone packed with 3 mm diameter glass beads or 1 to 2 mm diameter aluminum oxide beads. The electric field was generated by a commercially available DC power supply. An PDMSDMV exiting the separator was collected and analyzed for total potassium using AA. The solids concentration was determined using ultrafiltration and subsequent weighing of the paper. Runs were conducted at different flow rates, temperatures, voltages, fluid viscosity and solids concentration. The run parameters and analysis results are reported in Table 4.

TABLE 4

Potassium Carbonate and Potassium Bicarbonate Particulate Removed From PDMSDMV

| Run No. | Flow Rate ml/min | Temp. °C. | Calc. Visc. Pa.s | Voltage Kv/in | Potassium In ppm/wt | Potassium Out ppm/wt | Bead Mat's |
|---|---|---|---|---|---|---|---|
| 1 | 18 | 66 | 1 | 5 | 29 | 7.6 | glass |
| 2 | 18 | 19 | 2 | 25 | 29 | 13 | glass |
| 3 | 18 | 69 | 0.9 | 25 | 29 | 2 | glass |
| 4 | 11 | 120 | 0.5 | 0.6 | 25 | 1.44 | AlO$_2$ |

EXAMPLE 5

The ability to remove solid potassium chloride and magnesium oxide particulate from a polymethylphenyldimethylsiloxane copolymer(PMPDMS) fluid by an electric field enhanced separator was evaluated. The PMPDMS fluid evaluated had a viscosity in the range of about 0.1 to 0.5 Pa·s at 25° C. and contained solid potassium chloride particulate determined to have a particle size of about 0.5 to 4 microns and magnesium oxide having a particle size of about 5 to 40 microns measured using a scanning electron microscope. The concentration of the solids was determined using ultrafiltration and subsequent weighing of the filter paper. The PMPDMS fluid was fed into a carbon steel separator similar to that described in FIG. 1. The separator was 5.1 cm in diameter, 43 cm in length, with a 5.1 cm by 30.5 cm active zone packed with 3 mm diameter glass beads. The electric field was generated by a commercially available DC power supply. An PMPDMS exiting the separator was collected and analyzed for solids concentration. Runs were conducted at different flow rates, temperatures, voltages and solids concentration. The run parameters and analysis results are reported in Table 5.

TABLE 5

Potassium Chloride and Magnesium Oxide Particulate Removed From PMPDMS

| Run No. | Flow Rate ml/min | Temp. °C. | Voltage Kv/in | Solids In ppm/wt | Solids Out ppm/wt |
|---|---|---|---|---|---|
| 1 | 33 | 50 | 5 | 33.4 | 19.3 |
| 2 | 30 | 50 | 15 | 33.4 | 6.2 |
| 3 | 10 | 50 | 15 | 33.4 | 2.4 |
| 4 | 10 | 50 | 5 | 33.4 | 6.6 |
| 5 | 32 | 140 | 15 | 33.4 | 0.5 |
| 6 | 33 | 150 | 15 | 32.6 | 1.9 |
| 7 | 33 | 150 | 22 | 32.6 | 0.6 |
| 8 | 12 | 150 | 22 | 32.6 | 1.5 |
| 9 | 12 | 150 | 15 | 32.6 | 1.5 |

EXAMPLE 6

The ability to remove solid potassium chloride and magnesium oxide particulate from a polymethylphenyldimethylsiloxane copolymer (PMPDMS) fluid by an electric field enhanced separator was evaluated. The PMPDMS evaluated fluid had a viscosity in the range of about 0.1 to 0.5 Pa·s at 25° C. and contained solid potassium chloride particulate determined to have a particle size of about 0.5 to 4 microns and magnesium oxide having a particle size of about 5 to 40 microns measured using a scanning electron microscope. The concentration of the solids was determined using ultrafiltration and subsequent weighing of the filter paper. The PMPDMS fluid was fed into carbon steel separator similar to that described in FIG. 1. The separator was 5.1 cm in diameter, 43 cm in length, with a 5.1 cm by 30.5 cm active zone packed with 3 mm diameter glass beads. The electric field was generated by a commercially available DC power supply. An PMPDMS exiting the separator was collected and analyzed for solids concentration. Runs were conducted at different flow rates, temperatures, voltages and solids concentration. The run parameters and analysis results are reported in Table 6.

TABLE 6

Potassium Chloride and Magnesium Oxide Particulate Removed From PMPDMS

| Run No. | Flow Rate ml/min | Temp. °C. | Voltage Kv/in | Solids In ppm/wt | Solids Out ppm/wt |
|---|---|---|---|---|---|
| 1 | 33 | 150 | 15 | 172.5 | 0.6 |
| 2 | 12 | 150 | 15 | 172.5 | 4.9 |

EXAMPLE 7

The ability to remove solid calcium carbonate particulate from a polymethylhexenyldimethylsiloxane copolymer (PMHDMS) fluid by an electric field enhanced separator was evaluated. The PMHDMS fluid evaluated had a viscosity of about 0.4 Pa·s at 25° C. and contained solid calcium carbonate particulate determined to have a particle size of about 0.5 to 10 microns measured using a scanning electron microscope. The concentration of the solids was determined using ultrafiltration and subsequent weighing of the filter paper. The PMHDMS fluid was fed into carbon steel separator similar to that described in FIG. 1. The separator was 5.1 cm in diameter, 43 cm in length, with a 5.1 cm by 30.5 cm active zone packed with 3 mm diameter glass beads. The electric field was generated by a commercially available DC power supply. An PMHDMS exiting the separator was collected and analyzed for solids concentration. Runs were conducted at different flow rates, temperatures, voltages and solids concentration. The run parameters and analysis results are reported in Table 7.

TABLE 7

Calcium Carbonate Particulate Removed From PMHDMS

| Run No. | Flow Rate ml/min | Temp. °C. | Voltage Kv/in | Solids In ppm/wt | Solids Out ppm/wt |
|---|---|---|---|---|---|
| 1 | 33 | 150 | 15 | 2411 | 13.9 |
| 2 | 33 | 150 | 22 | 2411 | 11.2 |
| 3 | 12 | 150 | 22 | 2411 | 14.1 |

What is claimed is:

1. A method for removing a particulate from a liquid silicon compound comprising contacting a suspension comprising a non-conducting liquid silane described by formula

where each $R^1$ is an independently selected monovalent hydrocarbon radical comprising 1 to about 12 carbon atoms, X is a halogen atom, a=0 to 4, b=0 to 4, and a+b=0 to 4 and a particulate having a different dielectric constant than the non-conducting liquid silane with a non-conducting packing substrate in an electric field.

2. A method for removing a particulate from a liquid silicon compound comprising contacting a suspension comprising a non-conducting liquid polysilane polymer described by formula

where each $R^4$ can be independently selected from the group consisting of hydrogen, halogen, and monovalent hydrocarbon radicals comprising 1 to about 12 carbon atoms, n is a value within a range of 0 to about 500 and a particulate having a different dielectric constant than the non-conducting liquid polysilane polymer with a non-conducting packing substrate in an electric field.

3. A method according to claim 1 or 2, wherein the non-conducting liquid silane or non-conducting liquid polysilane polymer has a viscosity in the range of about 0.0001 to 100 Pa·s at 25° C.

4. A method according to claim 1 or 2, wherein the non-conducting liquid silane or non-conducting liquid polysilane polymer has a viscosity in the range of about 0.0005 to 2 Pa·s at 25° C.

5. A method according to claim 1 or 2, wherein the non-conducting liquid silane or non-conducting liquid polysilane polymer has a viscosity in the range of about 0.005 to 0.5 Pa·s at 25° C.

6. A method according to claim 1 or 2, wherein the non-conducting packing substrate is glass beads.

7. A method according to claim 6, wherein the beads have a diameter of 1 to about 10 mm.

8. A method according to claim 6, wherein the beads have a diameter of about 2 to 4 mm.

9. A method according to claim 1 or 2, wherein the non-conducting packing substrate is aluminum oxide beads.

10. A method according to claim 9, wherein the beads have a diameter of 1 to about 10 mm.

11. A method according to claim 9, wherein the beads have a diameter of about 2 to 4 mm.

12. A method according to claim 1 or 2, wherein the particulate have a particle size ranging from about 0.01 to 100 microns.

13. A method according to claim 1 or 2, wherein the particulate have a particle size ranging from about 0.05 to 10 microns.

14. A method according to claim 1 or 2, wherein the non-conducting packing substrate is cleaned by backflushing.

15. A method according to claim 1 or 2, wherein the beads of the packed bed are cleaned by backflushing.

16. A method according to claim 1 or 2, wherein the non-conducting packing substrate has a dielectric constant different from that of the particulate and the non-conducting liquid silicon containing compound.

17. A method according to claim 1 or 2, wherein the particulate is deformable.

* * * * *